US008547690B2

(12) United States Patent
Hu et al.

(10) Patent No.: US 8,547,690 B2
(45) Date of Patent: Oct. 1, 2013

(54) RETENTION DEVICE FOR DATA STORAGE MODULE

(75) Inventors: Xiu-Quan Hu, Shenzhen (CN); Lin-Han Wu, Shenzhen (CN); Li Hou, Shenzhen (CN); Wei Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 131 days.

(21) Appl. No.: 13/337,194

(22) Filed: Dec. 26, 2011

(65) Prior Publication Data

US 2013/0058033 A1 Mar. 7, 2013

(51) Int. Cl.
G06F 1/16 (2006.01)

(52) U.S. Cl.
USPC .............. 361/679.33; 312/245; 365/185.11; 206/308.1; 248/500

(58) Field of Classification Search
USPC .............. 320/101, 104, 109; 248/342, 501, 248/316.8, 27.1, 500; 206/525, 39, 438, 206/312, 311, 232, 286, 308.1, 701; 361/679.39, 679.33, 679.47, 679.31, 679.34, 361/679.38, 679.07, 679.06, 679.26, 679.27, 361/679.55, 679.58; 312/223.1, 223.2, 265.6, 312/9.9, 333, 334.31, 9.43, 272.5, 245; 365/189.05, 149, 185.17, 158, 185.11; 402/70
See application file for complete search history.

(56) References Cited

U.S. PATENT DOCUMENTS

| 6,076,989 A | * | 6/2000 | Pearce et al. | 402/70 |
| 7,079,382 B2 | * | 7/2006 | Chen et al. | 361/679.39 |
| 2013/0069503 A1 | * | 3/2013 | Hu et al. | 312/223.2 |

* cited by examiner

Primary Examiner — Hung Duong
(74) Attorney, Agent, or Firm — Altis & Wispro Law Group, Inc.

(57) ABSTRACT

A retention device includes a holder and an extractable casing mounted to the holder. The retention device includes a base, a cover opposite to the base, and a lateral plate extending from the base and interconnecting the base and the cover. The base, the side plates, and the cover cooperatively define a rectangular first cavity with an opening at a lateral side. The casing and the holder cooperatively define a second cavity. A size of the second cavity is less than that of the first cavity.

13 Claims, 6 Drawing Sheets

RETENTION DEVICE FOR DATA STORAGE MODULE

BACKGROUND

1. Technical Field

The one disclosure relates to retention devices and, more particularly, to a retention device for a data storage module of an electronic apparatus.

2. Description of Related Art

An electronic apparatus, such as a desktop computer, tower computer, or server, usually includes storage modules, such as hard disk drives, compact disk read-only memory drives, and digital video disc drives. These devices can be added to increase the functionality of the electronic apparatus as desired by a user.

A retention device is generally used to install a hard disk drive in a computer. However, the retention device is generally fixed and may support only one type of data storage module, so when the configuration type of the data storage module of an electronic apparatus is changed, the retention device also needs to be replaced, which is costly.

Therefore, what is needed is a retention device which can overcome the shortcomings described above.

BRIEF DESCRIPTION OF THE DRAWINGS

Many aspects of the one embodiment can be better understood with reference to the following drawings. The components in the drawings are not necessarily drawn to scale, the emphasis instead being placed upon clearly illustrating the principles of the one embodiment. Moreover, in the drawings, all the views are schematic, and like reference numerals designate corresponding parts throughout the several views.

DETAILED DESCRIPTION

Reference will now be made to the drawings to describe the present embodiment of a retention device, in detail.

Figure 1:
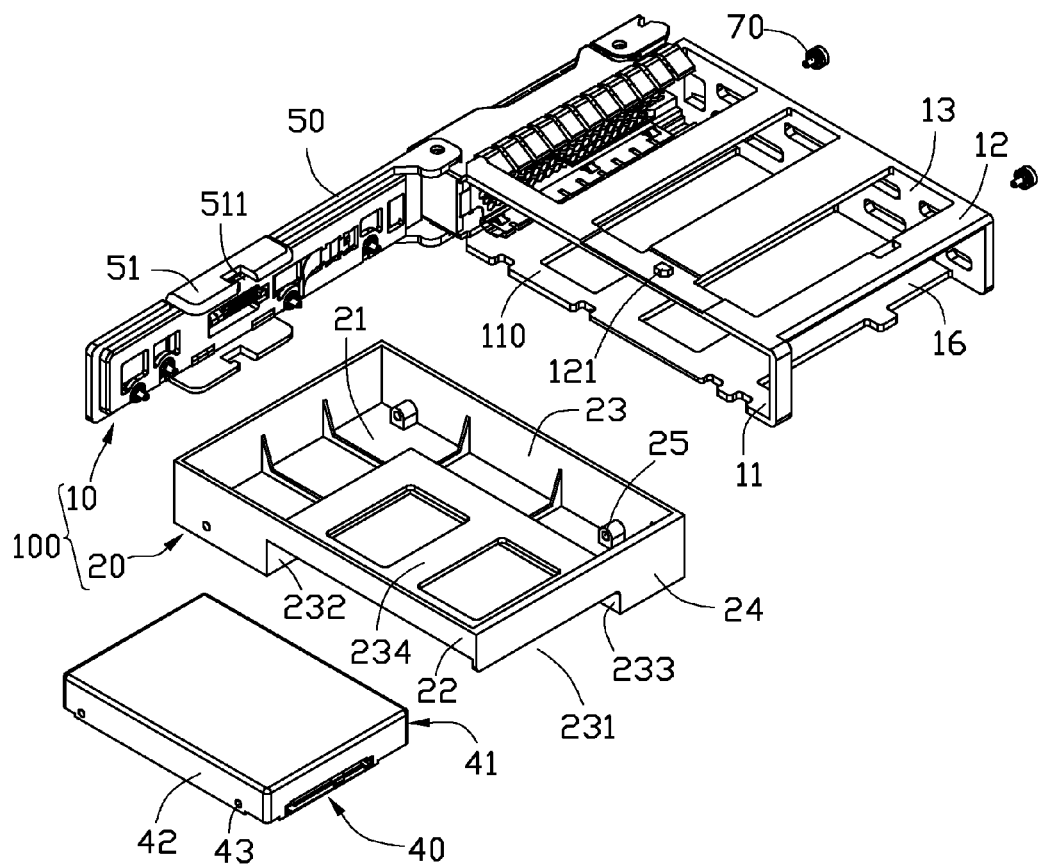
FIG. 1 is a disassembled view of a retention device and a first storage module, in accordance with an embodiment of the one disclosure.
Figure 2:
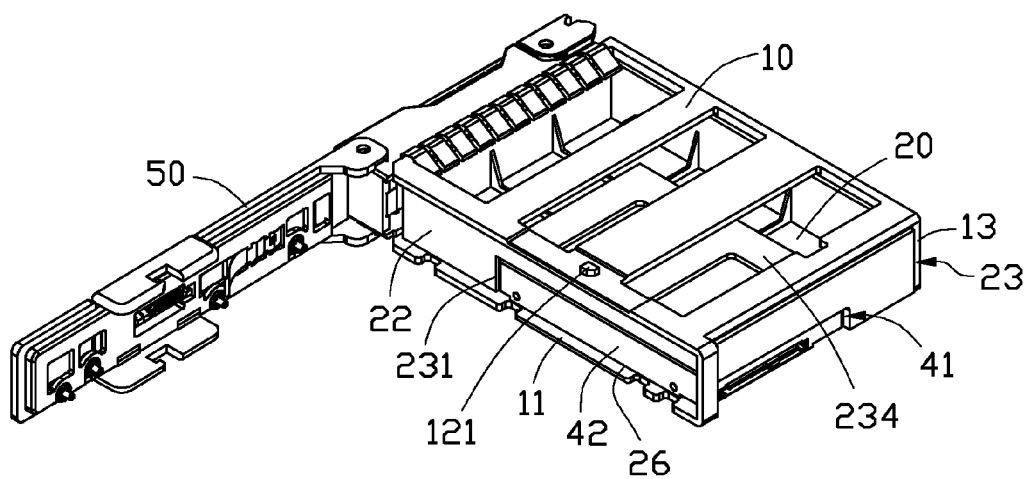
FIG. 2 is a partially assembled view of the retention device and the first storage module of FIG. 1.
Figure 3:
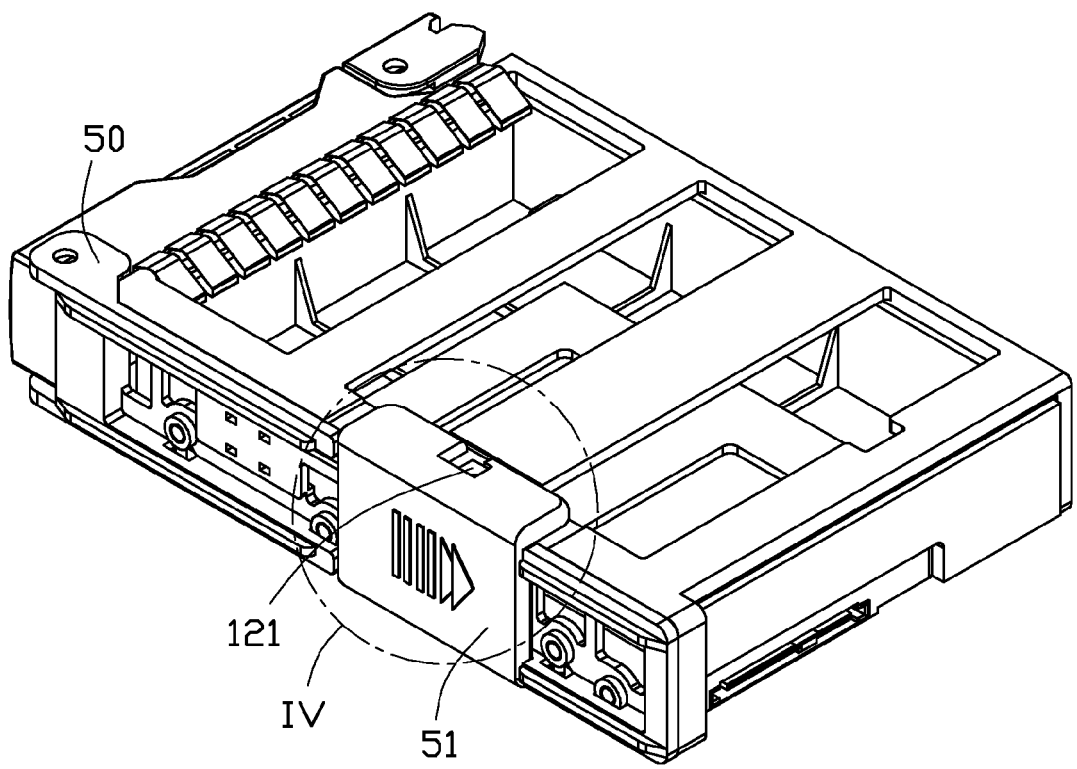
FIG. 3 is an assembled view of the retention device and the first storage module of FIG. 1.

FIGS. 1, 2 and 3, one embodiment of a retention device 100 includes a holder 10 and a casing 20. The retention device 100 receives a storage module.

The holder 10 includes a base 11, a cover 12 opposite to the base 11, and lateral plates 13 interconnecting the base 11 and the cover 12. The base 11, the side plates 13, and the cover 12 cooperatively define a rectangular first cavity 16 with an opening 110 at a lateral side of the holder 10. A projection 121 is arranged at a middle of a top side of the cover 12.

The casing 20 engages in the first cavity 16 of the holder 10 and includes a bottom plate 21, and a first side wall 22 and a second side wall 23 extending from two opposite lateral sides of the bottom plate 21. In addition, a third side wall 24 extends from the bottom plate 21 and interconnects the first side wall 22 and the second side wall 23. In one embodiment, a length of each of the first and second side plates 22, 23 is larger than that of the third side wall 24. A first undercut 231 is defined in an area where the first side wall 22 joins the third side wall 24. In one embodiment, the first undercut 231 is rectangular, which is cooperatively defined by a first side plate 232 substantially parallel to the third side wall 24, a second side plate 233 substantially parallel to the first side wall 22, and a top plate 234 substantially parallel to the bottom plate 21. A height of each of the first and second side plates 232, 233 is less than that of the first, second, and third side walls 22, 23, 24. In one embodiment, a plurality of fixing holes 25 is defined at the first and second side walls 22, 23.

The casing 20 is extractable and mounted in the holder 10. The second side wall 23 abuts to the lateral plate 13, and the first side wall 22 is exposed out in the opening 110 of the casing 10. The casing 20 with the first undercut 231, engages with the bottom plate 21 of the casing 20 to cooperatively define a second cavity 26. In one embodiment, a size of the second cavity 26 is less than that of the first cavity 16.

Figure 4:
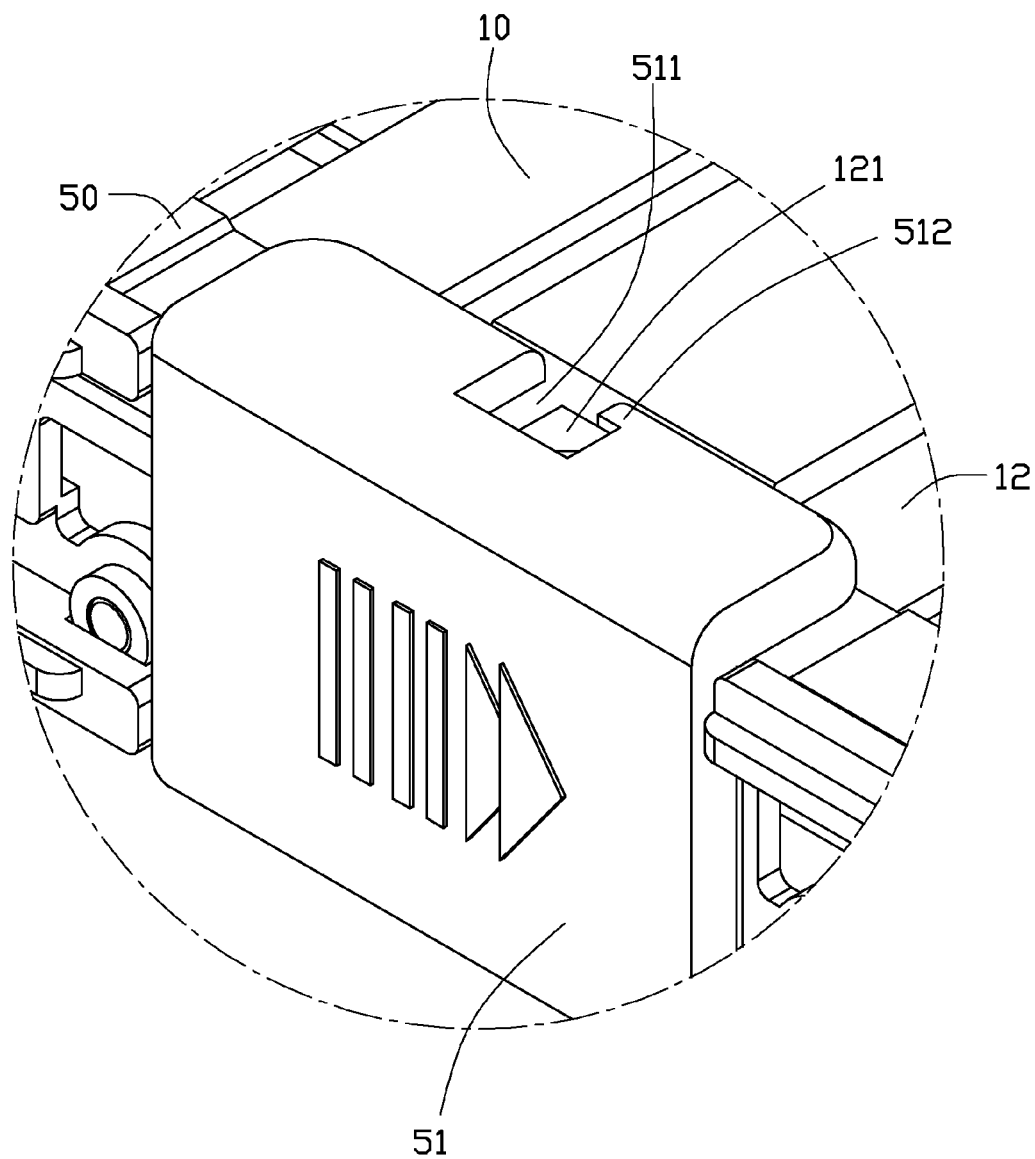
FIG. 4 is an enlarged view of IV of FIG. 3.

Referring to FIG. 4, the retention device 100 further includes a side cover 50 covering the opening 110 of the holder 10. The side cover 50 pivotably connects the holder 10. The side cover 50 includes a movably engaged U-shaped latch 51. The latch 51 defines a notch 511 at a top portion, corresponding to the projection 121 of the cover 12 of the holder 10. A tab 512 extends out form the latch 51 to semi-close the notch 511. The side cover 50 is fixed on the holder 10 by sliding the latch 51 causing the projection 121 to be received in the notch 511.

The retention device 100 can receive storage modules with different sizes. In one embodiment, the retention device 100 can receive a first storage module 40 or a second storage module 30, and a size of the first storage module 40 is less than that of the second storage module 30.

Figure 5:
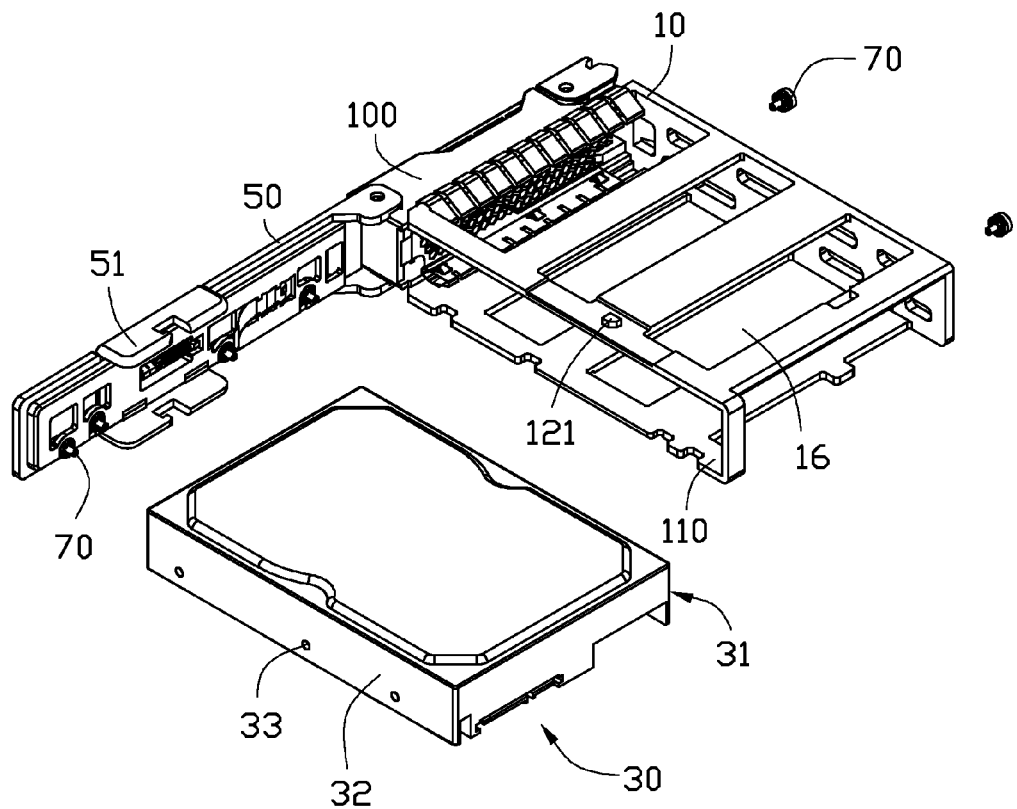
FIG. 5 is a disassembled view of the retention device of FIG. 1 and a second storage module.
Figure 6:
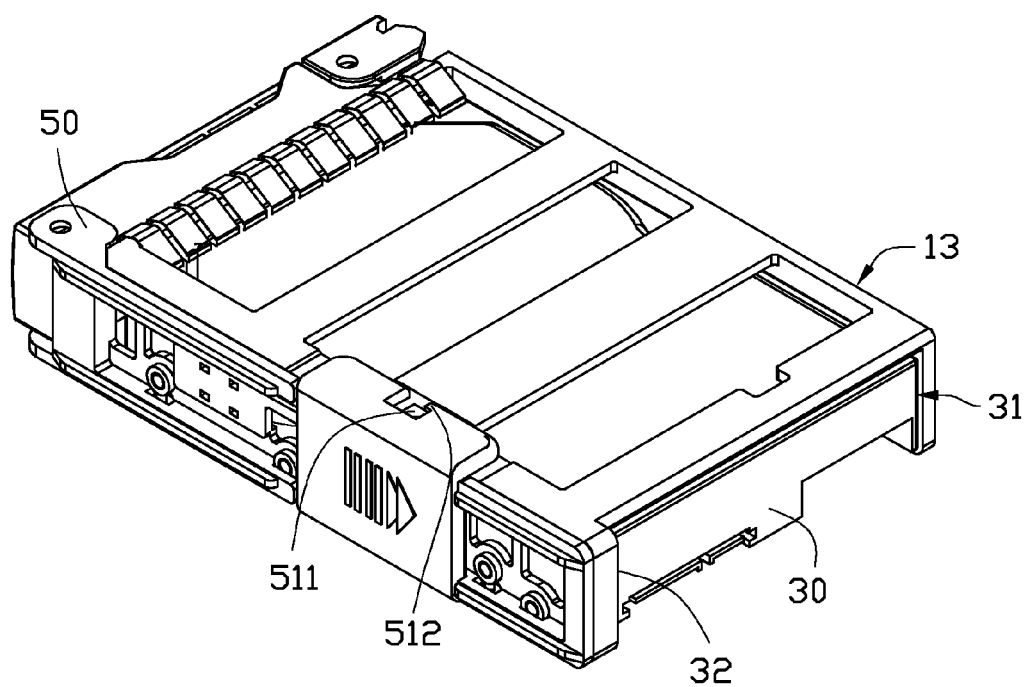
FIG. 6 is an assembled view of the retention device and the second storage module of FIG. 5.

Referring to FIGS. 5 and 6, the retention device 100 receives the second storage module 30. The second storage module 30 has a first side surface 31 and a second side surface 32 opposite to the first side surface 31. The first and second side surfaces 31 and 32 define a plurality of first holes 33 for fixing the second storage module 30 on the holder 10. In assembly, removing the casing 20, the second storage module 30 is directly extractable and mounted to the holder 10, abutting the first side surface 31 with the lateral plate 13. In addition, the second side surface 32 is exposed to the opening 110. Sliding the side cover 50 causes the projection 121 to be received in the notch 511, thereby fixing the side cover 50 on the holder 10. In one embodiment, the retention device 100 further includes a plurality of bolts 70. The bolts 70 extend through the lateral plate 13, the fixing holes 25, and then engage with the first holes 33 of the second storage module 30, to fix the second storage module 30 on the holder 10.

FIGS. 1, 2 and 3 show the retention device 100 receiving the first storage module 40. The first storage module 40 includes a third side surface 41 and a fourth side surface 42 opposite to the third side surface 41. The third and fourth side surface 41 and 42 define a plurality of second holes 43 for fixing the first storage module 40 on the holder 10. In assembly, the casing 20 is received in the holder 10, and the first side wall 22 is exposed from the opening 110 of the casing 10. The first storage module 40 is received in the second cavity 26, abutting the third side surface 41 with the second side plate 233, and the fourth side surface 42 is exposed from the opening 110. Sliding the side cover 50 causes the projection 121 to be received in the notch 511, thereby fixing the side cover 50 on the holder 10. The bolts 70 are extended through the lateral plate 13, the fixing holes 25, and then engaged with the second holes 43 of the first storage module 40, to fix the second storage module 30 on the holder 10.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. A retention device comprising:
   a holder comprising a base, a cover opposite to the base, and a lateral plate interconnecting the base and the cover, wherein the base, the side plates, and the cover cooperatively define a first cavity with an opening at a lateral side of the holder; and
   an extractable casing mounted to the holder through the opening, the casing and the holder cooperatively defining a second cavity, a size of the second cavity being smaller than that of the first cavity.

2. The retention device of claim 1, wherein the casing comprises a bottom plate, a first side wall and a second side wall extending from two opposite lateral sides of the bottom plate, a third side wall extending from the bottom plate and interconnecting the first side wall and the second side wall, and a first notch defined in an area where the first side wall joins the third side wall, the first notch engaging with the holder to define the second cavity.

3. The retention device of claim 2, wherein the undercut is rectangular and defined by a first side plate, a second side plate, and a top plate.

4. The retention device of claim 3, wherein the first side plate of the undercut is substantially parallel to the third side wall of the casing, the second side plate of the undercut is substantially parallel to the first side wall of the casing, and the top plate of the undercut is substantially parallel to the bottom plate of the casing.

5. The retention device of claim 1, further comprising a side cover pivotably connected with the holder and covering the opening of the holder.

6. The retention device of claim 5, wherein the side cover comprises a slidable latch thereon, a projection is arranged at the cover of the holder, and the projection engages with the latch to fix the side cover on the holder.

7. The retention device of claim 6, wherein the latch is U-shaped.

8. The retention device of claim 6, wherein the latch defines a notch at a top potion thereof, a tab extends out form the latch to semi-close the notch, and the projection engages with the tab of the latch.

9. An electronic device, comprising:
   a retention device comprising:
   a holder comprising a base, a cover opposite to the base, and a lateral plate extending from the base and interconnecting the base and the cover, wherein the base, the side plates, and the cover cooperatively define a rectangular first cavity with an opening at a lateral side of the cavity;
   an extractable casing mounted to the holder, the casing and the holder cooperatively defining a second cavity, a size of the second cavity being smaller than that of the first cavity; and
   a storage module selectively fixed in the first cavity and the second cavity of the retention device.

10. The electronic device of claim 9, wherein the casing comprises a bottom plate, a first side wall and a second side wall extending from two opposite lateral sides of the bottom plate, a third side wall extending from the bottom plate and interconnecting the first side wall and the second side wall, and a first notch being defined in an area where the first side wall joins the third side wall, the first notch engaging with the holder to define the second cavity.

11. The electronic device of claim 10, wherein the undercut is rectangular and defined by a first side plate, a second side plate, and a top plate.

12. The retention device of claim 11, wherein the first side plate of the undercut is substantially parallel to the third side wall of the casing, the second side plate of the undercut is substantially parallel to the first side wall of the casing, and the top plate of the undercut is substantially parallel to the bottom plate of the casing.

13. A retention device for supporting a storage device, the retention device comprising:
   a holder defining a first cavity therein and an opening at a lateral side of the holder;
   a casing detachably mounted in the first cavity of the holder through the opening, the casing defining a second cavity less than that of the first cavity; and
   a cover rotatably connected to the holder for covering the opening.

* * * * *